United States Patent [19]
Cocchi

[11] Patent Number: 5,382,090
[45] Date of Patent: Jan. 17, 1995

[54] MACHINE FOR MAKING AND DISPENSING ICE CREAM SHAKES

[75] Inventor: Gino Cocchi, Bologna, Italy

[73] Assignee: Carpigiani S.r.l., Bologna, Italy

[21] Appl. No.: 149,780

[22] Filed: Nov. 10, 1993

[30] Foreign Application Priority Data

Nov. 27, 1992 [IT] Italy ............................ GE92A000125

[51] Int. Cl.6 ........................ B01F 15/02; B01F 15/06
[52] U.S. Cl. ...................................... 366/177; 62/342; 222/145; 366/144
[58] Field of Search ................ 366/150, 177, 182, 144, 366/149, 184, 194, 195, 196; 62/342, 343; 222/145, 129.1, 226, 229, 236

[56] References Cited

U.S. PATENT DOCUMENTS

| | | |
|---|---|---|
| 2,669,945 | 2/1954 | Wildebour . |
| 3,149,756 | 9/1964 | Carpigiani . |
| 3,276,633 | 10/1966 | Rahauser .................... 62/342 |
| 3,830,407 | 8/1974 | Wierlo . |
| 3,934,427 | 1/1976 | Keyes ........................ 62/342 |
| 4,463,572 | 8/1984 | Brown ........................ 366/144 |
| 4,580,905 | 4/1986 | Schwitters et al. ............. 366/149 |
| 4,923,093 | 5/1990 | Gerber ........................ 222/145 |

FOREIGN PATENT DOCUMENTS 62-146568  6/1987  Japan .

Primary Examiner—Robert W. Jenkins
Attorney, Agent, or Firm—Larson and Taylor

[57] ABSTRACT

The machine includes an ice cream making machine, and a duct for feeding the produced ice cream to a tube communicating at its lower end with a mixing chamber. Injectors are provided opening into said tube in proximity of the mixing chamber for feeding one or more syrups to mixing chamber. A mixer is mounted in said mixing chamber, and the mixer is operated in order to mix the ice cream and the syrups which are delivered to the mixing chamber from the tube by a piston slidable into the tube. The syrup feeding injectors are located between the ice cream feeding duct and the mixing chamber, in an area of the tube which is separated from the ice cream feeding duct by at least one sealing element.

4 Claims, 3 Drawing Sheets

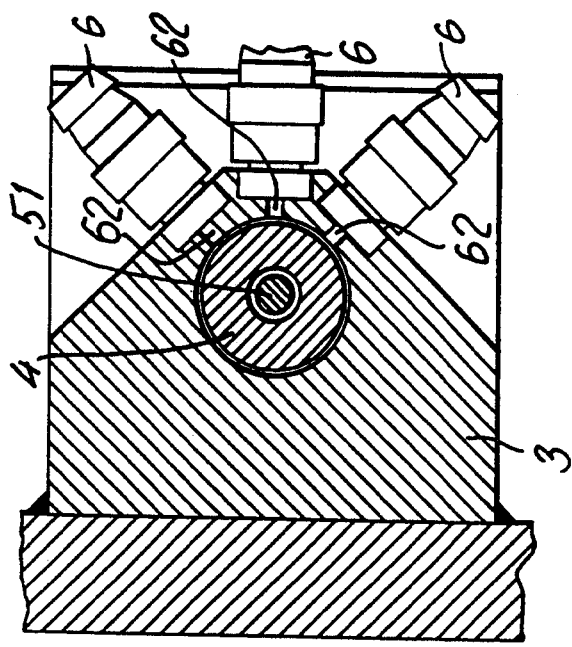
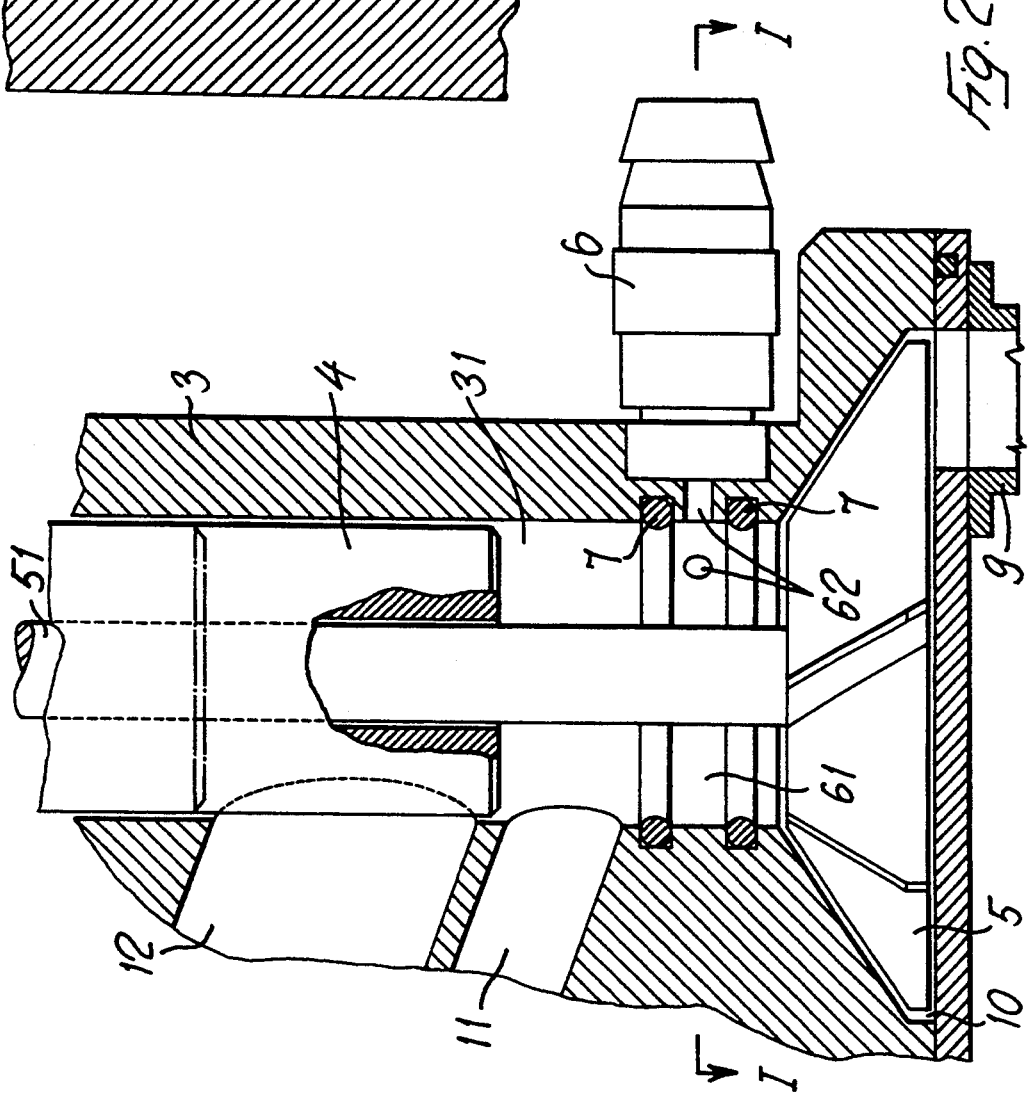

MACHINE FOR MAKING AND DISPENSING ICE CREAM SHAKES

BACKGROUND OF THE INVENTION

The present invention relates to machines for making and dispensing ice cream shakes, ice cream slushes or the like frozen confections. The term ice cream shake is used to mean a flavored frozen confection which is made from a neutral frozen confection such as ice cream, frozen custard or the like blended and thoroughly mixed with a syrup essence of the desired flavor.

Machines of the type referred to above are known for example from U.S. Pat. Nos. 4,580,905; 3,830 407; 2,669,945; 3,149,756; IT-A-1 103 775. The machines comprise a machine for making the ice cream, means for feeding the ice cream produced to a dispensing door, means for feeding one or more syrup essences and means for mixing the ice cream with the syrup essence. Thus, for example, Italian Patent No. 1,103,775, or U.S. Pat. No. 4,580,905 describe one such machine which comprises a metering/dispensing tube joined to the freezing compartment door and connected to the latter by means of a pipe; a piston which is slidable in the tube and is actuated mechanically, electrically or pneumatically; two or more syrup injectors for flavoring the ice cream; and a rotor for mixing the syrup essence, driven by a drive shaft which is coaxial and concentric with the piston. In machines of the type described above, there is a recurrent problem whereby, when changing the syrup essence used to flavor the plain ice cream dispensed, it is also necessary to clean out any residues of the syrup used previously from the unit.

SUMMARY OF THE INVENTION

The present invention proposes to overcome these drawbacks of the known prior art machines by providing a device enabling ice cream shakes of various flavours to be produced, without the flavors becoming intermixed. This is possible using a machine for making and dispensing ice cream shakes of the type described previously, in which the syrup essence injectors are located between the ice cream delivery pipe and the mixing chamber, in an area which may be isolated from the remaing portion of the tube by means of at least one sealing element.

Advantageously, the syrup essence injectors are located in the area delimited by two sealing elements, in the area between the ice cream delivery pipe and the mixing chamber.

A further feature of the invention resides in the fact that the injectors are located beneath a sealing element interposed between the mixing chamber and the ice cream delivery pipe, and that there is an additional injector which can dispense water in order to wash out the syrup essence injection area.

A still further feature of the present invention is that, above the ice cream delivery pipe, there is a pipe of larger cross section which is used to wash out the unit.

Further advantages and features will become clear from the following description of two preferred embodiments of the invention, made with refernce to the appended drawings, in which:

BRIEF DESCRIPTION OF THE DRAWINGS

FIG. 2 is a detail, enlarged, from FIG. 1.

FIG. 3 is a cross section taken along the plane of line I—I of FIG. 2.

DESCRIPTION OF THE PREFERRED EMBODIMENTS OF THE INVENTION

Figure 1:
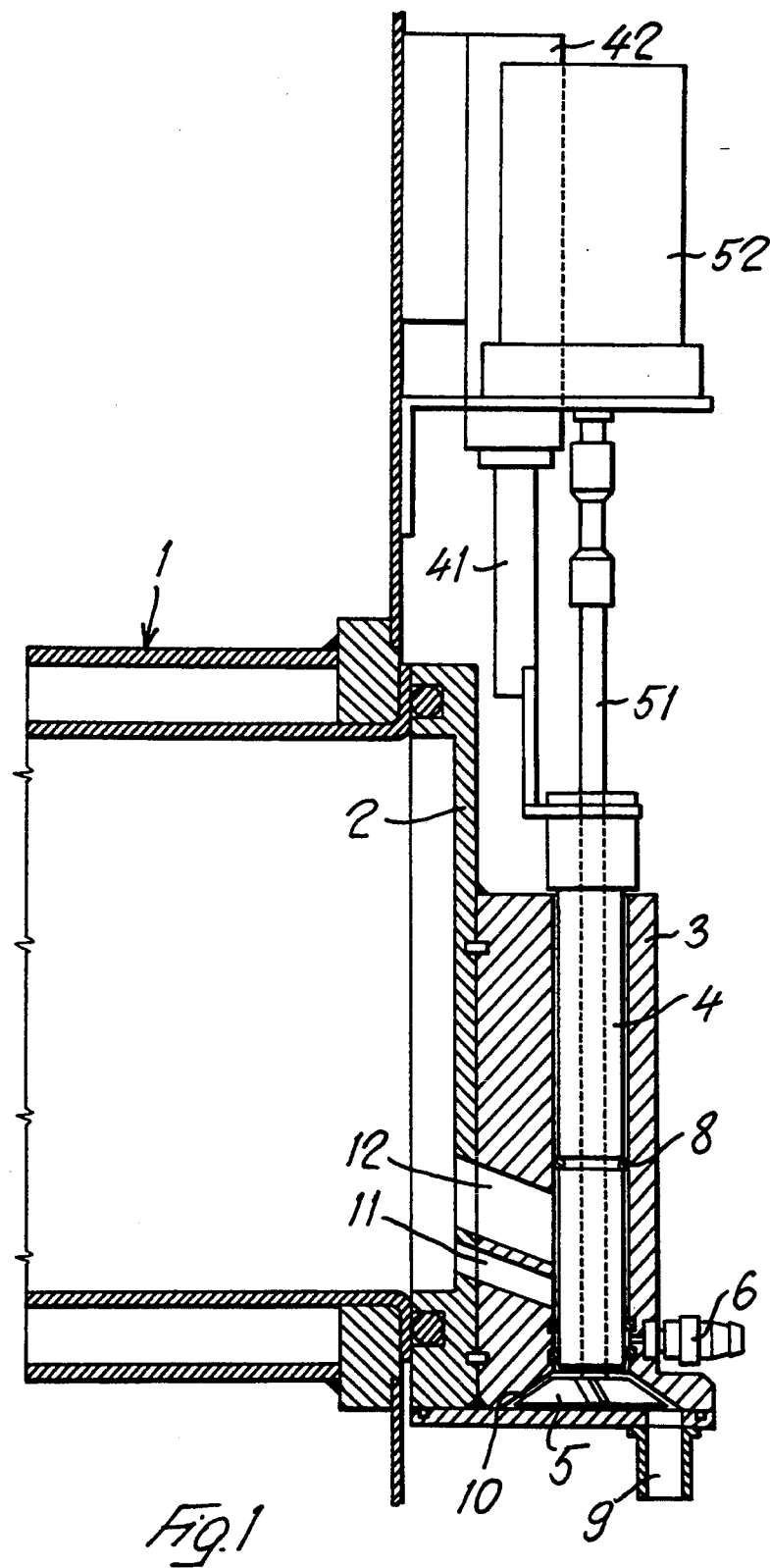
FIG. 1 is a view in longitudinal section of a first embodiment of the machine according to the present invention.

With reference to the drawings, and with particular reference to FIG. 1, 1 denotes a freezing barrel of a machine for making ice cream shakes according to the present invention. This barrel is refrigerated by, for instance, the evaporator of a conventional refrigeration mechanism (not shown) which is disposed around the outer side of freezing barrel, and in the freezing barrel a beater (not shown) is rotatably mounted, in conventional manner. All the means are known per se and will therefore not be described.

This barrel 1 is closed at one end by a suitable door 2. The door 2 is in turn joined to the block 3 in which the soft ice cream homogenizing and dispensing tube 31 is formed. The door 2 and the tube 31 communicate via the pipes 11 and 12 as will be described later. A piston 4 is slidaly mounted inside the tube 31 and is driven by means of the piston rod 41 which is connected to drive means, in this case pneumatic means 42; The piston 4 can also be actuated mechanically or electrically. The piston 4 is provided at an intermediate position with a sealing ring 8. Close to the lower end of the tube 31, on the internal surface of the tube and a short distance apart, are located two sealing rings 7 of the O-ring type. Numeral 11 denotes the ice-cream feeding pipe connecting the ice cream freezing barrel 1, in which the ice cream is prepared in a single plain flavor, to the tube 31 at a position just above the sealing rings 7. A second pipe 12 of a cross section substantially larger than the cross section of pipe 11, connect the barrel 1 to the tube 31 at a position just above pipe 11. 62 are injection pipes, connected to the syrup injectors 6 for flavoring the ice cream. Said pipes 62 open into the area 61 between the two sealing elements 7. At the lower end of the tube 31 is a frustoconical chamber 10, called the mixing chamber, in which the ice cream delivered from pipe 11 is mixed together with the essence flavours delivered through pipes 62 by means of a rotor 5. The rotor 5 is actuated by a drive shaft 51 connected to a small electric motor 52. The mixing chamber 10 communicates with the outside through the spout 9 for dispensing the flavored soft ice cream.

In operation, the piston 4 is first raised from its lowermost position just below the lowermost O-ring 7 (position of FIG. 1), to a position so as to fully uncover the opening of pipe 11, but so as to block off the opening of pipe 12 (solid line position of FIG. 2). In this position of the piston, the ice cream is delivered from compartment 1 into the tube 31 through the pipe 11. Soon thereafter the piston 4 is caused to be pushed down to the 0-ring 7 just above the injection pipes 62, so that ice cream passes from 31 into the area 61 delimited by the two sealing elements 7, from which area it removes the residue of syrup essence dispensed previously, which consist of a thin coating of fluid on the walls of the area 61 of the tube 31. At this point a new batch of syrup essence is caused to be dispensed through pipes 62, given that the ice cream flavored in this way will not be contamined in any way by previous dispensing operations. By further pushing down the piston 4 to a position just below the lowermost O-ring 7, the ice cream and syrup mixture is delivered to the mixing chamber 10, in which it is homogenised by the rotor 5, and from which it is dispensed in the form of flavored ice cream shake via the dispensing spout 9.

In this way, in order to ensure that the various flavors do not get mixed together, the introduction of ice cream through the pipe 11 and the injection of the syrup essence through the injectors 6, are staggered. This arrangement means that only a small amount of ice cream passing between the two sealing elements 7 is needed in order to clean out any residues from the area 61. In this case the role played by the sealing elements is very important since they prevent the syrup from diffusing inside the tube 31, by restricting it to a very small area.

The number of injectors used in a machine according to the invention may vary from 2 to as many as may be conveniently positioned in the block 3. In the described embodiment 3 injectors are used.

DESCRIPTION OF A SECOND EMBODIMENT OF THE INVENTION

Figure 5:
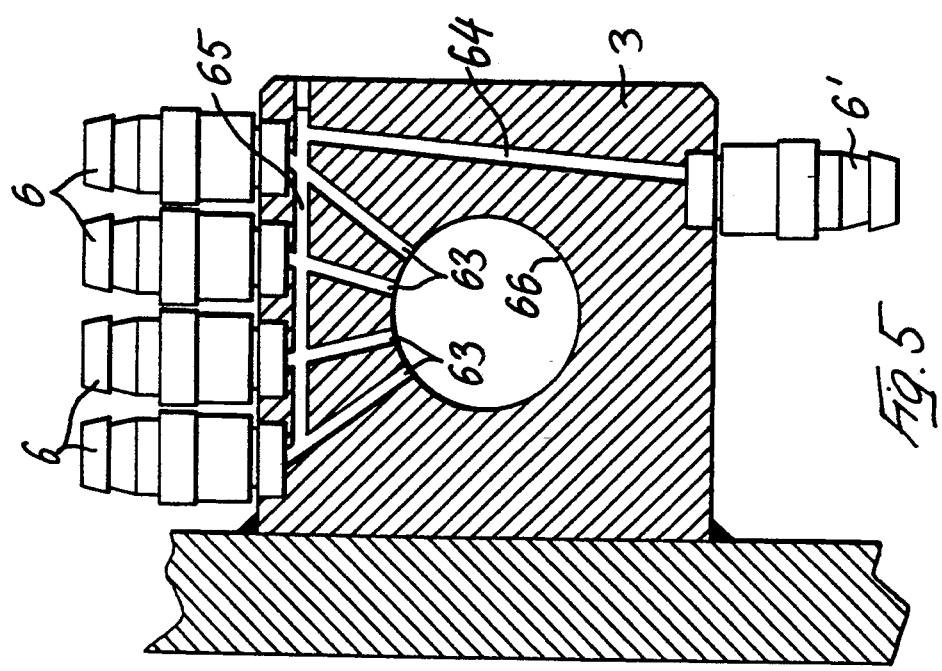
FIG. 5 is a cross section taken along the plane of line II—II of FIG. 4.
Figure 4:
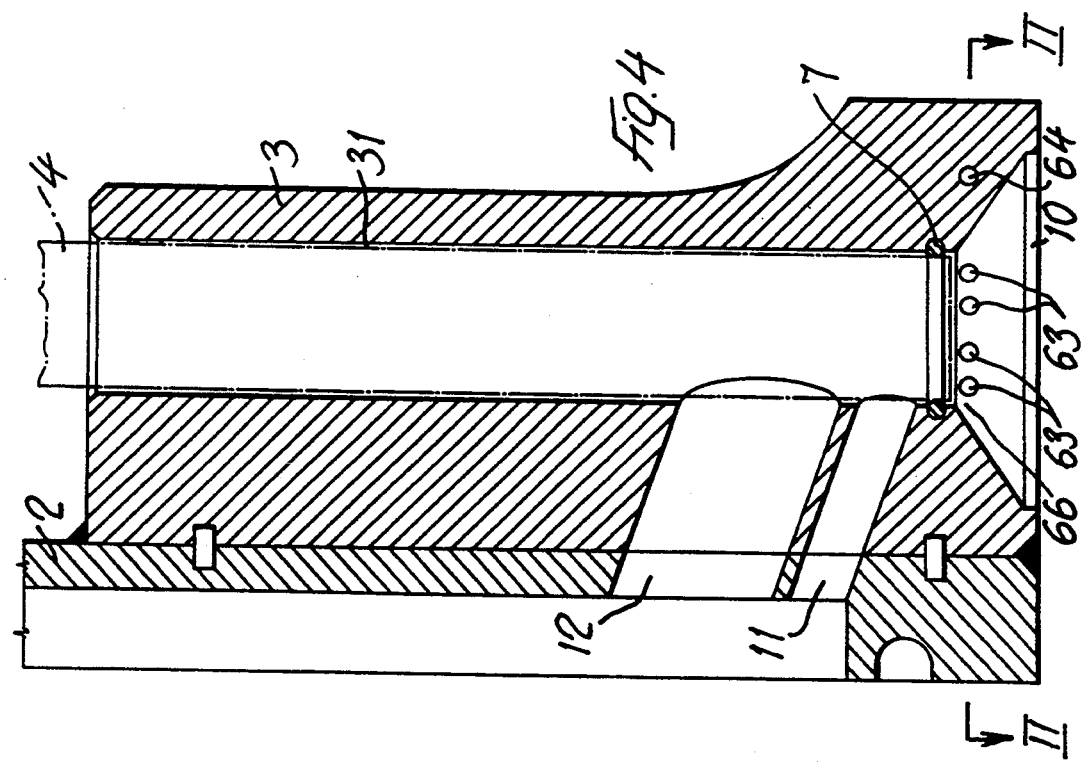
FIG. 4 is longitudinal section of a detail of a second embodiment of the device according to the present invention.

FIGS. 4 and 5 show a second embodiment of the invention. According to this embodiment, the tube 31 has a single sealing ring 7 between the mixing chamber 10 and the ice cream inlet pipe 11. The injectors 6 are located (FIG. 4) close to the upper end of the chamber 10, on one side of the block 3. On the other side of the block 3 is located an injector 6' which dispenses water. The injector 6' is connected through a duct 64 to a duct 65 which in turn intersects the ducts 63 introducing the flavored essences into the mixing chamber 10. The injector 6' may be actuated after each ice cream shake dispensing operation in order to wash out the residues from the previous syrup injecting operation.

According to this second embodiment of the invention, the ice cream and the syrup are introduced simultaneously into the area 66 above the mixing chamber 10.

In both embodiments of the present invention a pipe 12 is shown disposed above the pipe 11, which pipe 12 is normaly closed by the piston 4. This pipe is put into communication with the tube 31, by lifting the piston 4 to a position above said pipe (position in dotted lines of FIG. 2) during the washing operation of the machine, in order to ensure a greater flow volume of washing water and detergent from the barrel 1 toward the tube 31. In this manner a more efficient washing action is obtained and considerable time is saved.

I claim:
1. A machine for making and dispensing ice cream for shakes of various flavors comprising:
an ice cream freezing barrel;
a door closing one end of said barrel;
a block joined to said door and comprising a vertical tube and a sealing element carried by said block and around a face of said tube such that a vertical area is formed along said tube below said sealing element;
an ice cream inlet pipe connecting said freezing barrel to said tube above said sealing element;
a piston slidable in said tube to sealingly engage said sealing element;
a moving means for driving said piston along said tube between a lower position engaging said sealing element and an upper position above said sealing element such that ice cream flows through said vertical area when said piston is in the upper position and does not flow when said piston is in the lower position;
at least two injectors opening into said area of said tube;
a source of flavoring syrups connected to said injectors;
a mixing chamber in an end of said tube beneath said syrup injectors and said area for mixing the ice cream with the syrups; and
a mixing rotor in said chamber, a drive shaft which is coaxial and concentric with said piston connected to said mixing rotor, and a drive means connected to said drive shaft for rotating said drive shaft and said mixing rotor.
2. A machine according to claim 1, in which there is a second sealing element carried by said block and axially spaced from said first-mentioned sealing element with said injectors being located in an area delimited by said axially spaced sealing elements
3. A machine according to claim 1, further comprising an injector for dispensing water into the vertical area.
4. A machine according to claim 1, in which, above the ice cream inlet pipe, there is a second pipe connecting the barrel to said tube, the communication between said second pipe and the barrel being normally closed by said piston, and being opened only during a washing operation of the machine.

* * * * *